Oct. 19, 1971 M. J. CONWAY 3,613,266
METHOD AND MEANS FOR ENHANCING MENTAL IMAGING CAPABILITIES
Filed March 24, 1969 5 Sheets-Sheet 1

INVENTOR.
Malcolm J. Conway
BY Charles S. McGuire,
Attorney

United States Patent Office 3,613,266
Patented Oct. 19, 1971

3,613,266
METHOD AND MEANS FOR ENHANCING
MENTAL IMAGING CAPABILITIES
Malcolm J. Conway, Main Road, Gill, Mass.
Filed Mar. 24, 1969, Ser. No. 809,549
Int. Cl. G09b 19/00
U.S. Cl. 35—22 R          7 Claims

ABSTRACT OF THE DISCLOSURE

A method of developing and testing the degree of a student's ability to develop and retain a mental image by causing the student to record responses indicative of such image development in a manner such that the responses are not immediately visible to the student. Appropriate means for recording a visible image in a location not visible to the student as a stylus, or similar instrument, is moved without leaving a visible trace, are disclosed in various degrees of complexity. The recording of a mental image related to previously learned physical objects and relationships while precluding the student from directly viewing the progress or development of what he is recording improves the quality of the final recording as an indication of the complete mental picture which the student has developed. Additional inputs in the form of written, pictorial and/or audible material may be supplied to the student as the operation progresses to alter or modify the parameters, conditions, etc. which affect the mental image or responses developed therefrom.

---

This invention relates to teaching, learning and testing methods and means for carrying out such methods. More specifically, the invention relates to a novel method and means for determining the extent or effectiveness of an individual's complete mental picture of previously memorized matter by graphically reproducing portions of such matter while concealing from the individual's view that which he reproduces, thereby preventing "visual feedback" and forcing the individual at all times to rely solely on his own mental picture of the matter involved.

Virtually any method of teaching includes some form of testing the student to determine the quantity and quality of learning acquired therefrom. The results of the testing may, in turn, be used to influence the content and timing of continued teaching of the same individuals or to modify the teaching of the same subject matter to new individuals. It is possible, of course, that the method of testing may be individually defective and therefore have an adverse effect on the complete learning system. That is, a particular teaching method may be thoroughly effective for the individuals concerned, but defective testing methods may indicate that the teaching is ineffective, which may lead to a change for the worse in the teaching technique or content. Thus, a testing technique which provides an accurate picture of the learning actually imparted to the student is essential to the building of any effective teaching system.

One of the most familiar testing methods is the written or oral response to verbal questions about various aspects of the subject matter taught. While the usual verbal question-answer approach is suitable in many and, in fact, superior in some applications, it is deficient as a testing method when the subject matter is such that a good indication of continuity and integration of the learning in the student's mind cannot be gained from individual, essentially isolated questions, and when the students being tested have difficulty in comprehending the verbalized questions; that is, some individuals who are able to understand and retain the subject matter being taught will score poorly on a test comprising a set of verbalized questions because they fail to translate the verbiage into a clear understanding of what is required in the way of an answer.

Other testing techniques, such as the actual performance of a learned routine or set of tasks, are suitable only in connection with certain types of teaching and in some cases are limited by the availability of equipment necessary to perform such tasks. The testing in which the student is required to graphically reproduce diagrams, figures, and the like, relating to the subject matter which has been taught is superior to the verbal, individual question method in covering more thoroughly all aspects of certain subject matter but this method has also been subject to several limitations. For example, the subject matter to which such testing methods are applied has generally been limited to that where direct memory and recall of the physical or graphical appearance of objects, systems, circuits, or the like, are involved. Furthermore, it has been found that although an individual may be able to memorize, recall and graphically reproduce a complete diagram or other such representation of a complex system, he may still lack the ability to recall quickly and evalute the effect of additional information relating to a small portion of the system on the integrated whole.

Accordingly, it is a principal object of the present invention to provide an enhanced teaching system typified by a more accurate and reliable means of testing what the student has properly absorbed, thus allowing a more efficient presentation of the subject matter.

Another object is to provide a novel and improved testing method of the type involving graphical responses by the student which allows the range of subject matter to which such testing methods are normally applied to be greatly expanded.

A still further object is to provide a means for graphically recording student responses which stimulates and develops the student's ability to mentally visualize and recall previously presented instructional material.

Still another object is to provide a teaching-testing system through which students are trained to integrate their thinking patterns with respect to situations requiring deductive reasoning so that all factors which may affect the situation are simultaneously visualized, thereby allowing the mental picture thus formed to provide a complete and accurate basis for facts deduced therefrom.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Although the following disclosure contains only a limited number of suggested embodiments of means for carrying out the invention, as well as examples of instructional materials providing illustrations of the method by which the invention is practiced, it will be appreciated that a wide variety of different means of varying degrees of complexity may be designed and the field of subject matter to which the invention may be applied is virtually unlimited.

The invention recognizes that all individuals possess to a greater or lesser degree the ability to mentally visualize such things as procedures, situations, operating systems, and the like, through physical associations with such things. Traditional forms of teaching, and of testing acquired knowledge, regarding given situations or other combination of physical forms and abstract concepts have involved exposing the student to material associative with the subject matter being taught and relying upon his powers of rote memory and deductive reasoning to be able to recall and utilize the information thus imparted. In such teaching-testing systems the emphasis is on exposure to external, associative conditions, commonly a series of related but individual facts or other informational units, and any internal, mental image formation integrating such information into composite form for constant recall and utilization is, at best, a random and uncontrolled phenomenon. The present invention is based on the premise that the ability to mentally visualize a complete concept or to form a "mental schematic" of any given situation or set of circumstances is superior to the memorization of a series of individual facts associated with such situation, or the like. The invention is therefore directed toward a teaching-testing system aimed at encouraging and stimulating the abilities of the individual students to form, retain and utilize complete mental images associated with conditions or circumstances to which they are exposed and which require recall and deductive reasoning.

Figure 1:
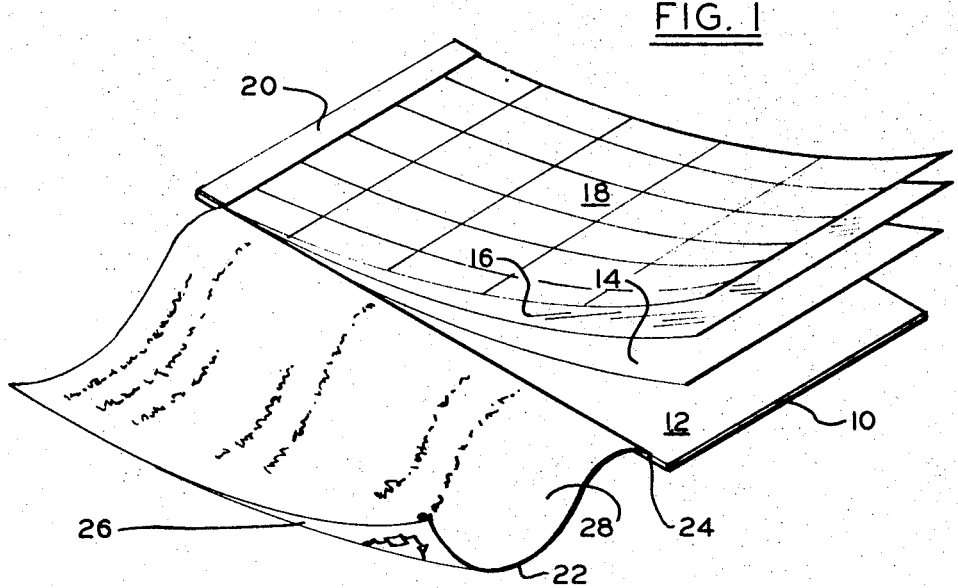
FIG. 1 is a perspective view of simplified means for recording graphical information according to the present invention.

In accordance with the foregoing objectives, the invention is practiced by first providing the students with instructional materials which encourage retention in the form of a complete mental image and then testing the students' formation and recall of such image by providing means for graphically recording material indicative of the efficiency of such mental image formation, the latter comprising means for recording a visible image in a location not visible to the student while actually in the process of recording the response. An illustrative example, in a quite simplified and basic form, of structure providing the aforesaid means is illustrated in FIG. 1. The structure of FIG. 1 includes rectangular base support sheet 10, of any suitable, relatively stiff material such as cardboard, plastic, etc., having one surface 12 coated with a colored wax composition. Arranged in overlying relationship to surface 12 are flexible sheets 14, of thin, transparent paper or plastic, and sheet 16, of a somewhat stiffer, transparent material such as acetate. The properties of surface 12 and sheet 14 are such that when localized pressure is utilized to press sheet 14 into contact with surface 12 a releasable adhesive bond is formed between the two with the bonded area exhibiting a different color from the background color of the wax coating as seen through sheet 14. Thus, a visible image may be formed by drawing a stylus, or similar instrument, across the surface of sheet 14 to press the latter into contact with surface 12, and this image may be removed or erased merely by lifting the sheet away from contact with surface 12, thereby breaking the bond. Since sheet 14 may be formed of a thin material susceptible to tearing or to having more permanent indentations placed therein by movement of the stylus, sheet 16 is provided as a protection against such occurrences, and sheet 14 is pressed into bonding contact with surface 12 by moving the stylus over sheet 16.

The structure thus far described may be precisely the same as the writing instruments widely sold as a children's toy and commonly termed "magic slates." Therefore, since such structures are widely known and commercially available a more detailed description is not considered necessary here. In addition to the basic "magic slate" construction, the present invention provides an additional sheet 18 of a material such as paper, plastic, etc. which is opaque yet flexible enough to transmit localized pressure from a stylus through sheet 14 to cause adherence of the latter to surface 12 in the usual manner. Thus, while a visible image will be formed by the adherence of sheet 14 to surface 12 by drawing a stylus across the surface of sheet 18, such image would not be visible to one moving the stylus due to the opacity of sheet 18. Of course, sheet 18 may be removed from covering relationship to sheet 14 and the visible image viewed before it is erased by pulling sheet 14 away from adhering contact with surface 12. For convenience, all of sheets 14, 16 and 18 are shown as being joined along a common edge 20 to base support 10.

One or more additional sheets, such as that indicated by the reference numeral 22, may also be associated with the basic structure described above for the purpose of combining instructional material therewith. Sheet 22 is shown as being joined along a lateral edge 24 to base support 10 and thus may be folded into covering or uncovering relationship with sheet 18. Sheet 22 may be utilized to present instructional material to the student by having such material, exemplary forms of which will be described later, printed on surface 26, and a series of instructions and/or questions indicating the type of graphical response required from the student printed on surface 28. Thus, the student may receive an instructional unit comprising the structure shown in FIG. 1 with sheet 22 in covering relation to sheet 18 and be given a specified amount of time to study the material on surface 26, such material being in a format, as discussed in more detail later herein, from which the student may conveniently form a composite mental image. After the prescribed time period has elapsed, the student turns sheet 22 to the position shown in FIG. 1 and reads the instructions or questions on surface 28. These instructions or questions elicit from the student a written response which is formed by drawing a stylus, or the like, across, the surface of sheet 18, thereby forming the visible image in the previously described manner. The image will not be visible to the student as it is formed, but may be viewed by raising sheet 18, which the student may be instructed to do upon completion of the instructions on surface 28, or at any time intermediate therein. Appropriate grid lines or other reference markings may be provided on the surface of sheet 18, as shown in FIG. 1, for the purpose of allowing the student to orient the graphical responses which he makes.

Figure 2:
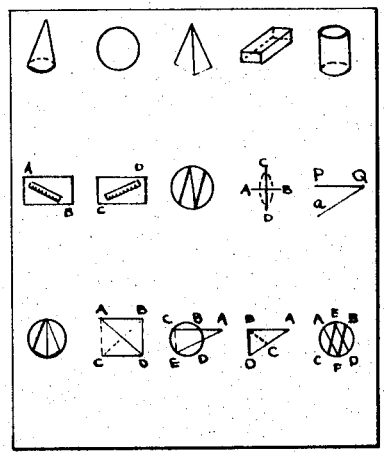
FIG. 2 is an example of one form of instructional material which may be used in practicing the invention in an elementary form.

A basic, preliminary form of instructional material which may be presented to develop a student's mental visualization capability might comprise, for example, an array of geometric figures. A number of individual figures such as those shown in FIG. 2 would be shown to the student, e.g., by being printed on surface 26 of sheet 22, for some specified period of time. It will be noted that the figures include both two and three dimensional objects in various orientations. As a preliminary exercise, the student could be instructed to visually study the figures in the first row for fifteen seconds and then to turn sheet 22 and use a stylus to trace on sheet 18 his visual recollection of these figures. Although the stylus would leave no visible trace on sheet 18, a visible image would be formed in sheet 14 as previously described. The process could then be repeated for the figures in rows two and three and, if the student's progress is satisfactory up to that point, he may be instructed to reproduce all the figures based on the mental image he has formed of the entire sheet of figures.

Although prior teaching systems involving memory exercises, or the like, have included graphical reproduction of series of memorized figures, such reproductions were always visible to the student as they were made. This had the effect of reenforcing or prompting the student's mental image of the portions of such figures which remained unwritten or drawn at any given time. The object, of course, is to encourage the formation of a complete and accurate mental image and the graphical response given by the student, in this case the reproduction in as exact a form as possible of geometric figures, is intended to provide an accurate account of the completeness and accuracy of such image. This indication is deteriorated, however, by the degree of mental prompting or "visual feedback" which the student derives from the material he has recorded up to any given point in the exercise, where such material is visible to him. For example, where an exercise comprises memorizing a number of figures and reproducing them based on the retained mental image, the later figures in the group may be "remembered" more easily by visual reference to the earlier figures already reproduced. This applies as well even to the later stages of construction of a single figure. The present invention, by forcing the student to graphically reproduce his mental image of the entire subject matter without visual reference, insures that only the *mental* image is relied upon and not a partial mental image reenforced by a partial visual image.

As well as providing a good indication of an individual student's short and long term mental retention of various types of mental images, the present invention may also provide valuable information about types of individual weaknesses in such areas. For example, some students may consistently retain mental images of two dimensional figures with high accuracy, but be noticeably weaker in their retention of three dimensional representations. Some students, on the other hand, may have trouble retaining mental images of three dimensional objects in particular orientations only, or may consistently transpose figures shown in one orientation into another. Likewise, some students may consistently omit certain details from the graphical recordings they make based on their mental images, while others may "remember too much," i.e., insert additional details not present in the instructional material with which they were provided. Information of this type, with sufficient additional background data, may be translated into more general indications of the individual student's strengths and weaknesses in the area of learning and reasoning. For example, a sufficient amount of properly correlated data regarding a student's mental imaging capabilities may be used as the basis of aptitude indications as well as to determine the types of instructional formats to which the student will most successfully respond.

Figure 3:
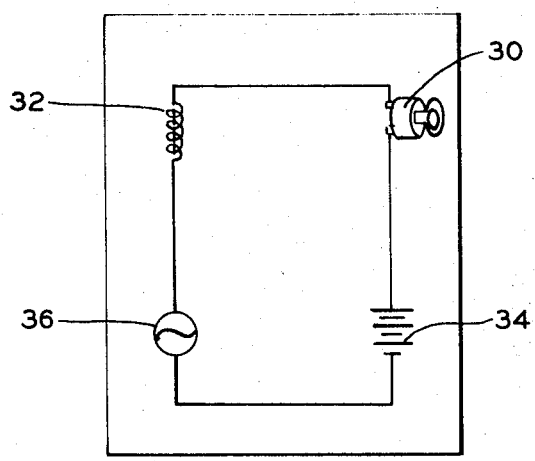
FIG. 3 is an example of additional instructional material illustrating a somewhat more advanced application of the invention.

Turning now to FIG. 3, an application of the invention to the mental visualization of a complete, real-world system, as opposed to the individual geometric forms of the preceding example, is shown. The example of FIG. 3 is also a quite simplified version of an actual system serving the purpose here only of illustration. The schematic elements shown in FIG. 3 comprise the elements normally found in a conventional automobile electric starter system and include key operated ignition switch 30, solenoid 32, battery 34, and starter assembly 36. These elements are connected by appropriate lines indicating a complete electrical circuit being formed thereby. When the student has had an opportunity to study the schematic diagram illustrating the system, he will be asked to reproduce the complete system according to the present invention, that is, by recording a graphical reproduction thereof which may be later examined for accuracy and completeness, but which is not visible to the student until he has completed the reproduction. Instructions may then be given regarding such things as malfunctions in the system and how these affect the physical representation of the system, and thus how the student's mental image of the system should be altered to properly visualize the malfunction. For example, a loose battery cable would be represented by a break in the line leading from one side or the other of the battery. A defective starter assembly could be represented by circling or placing an X through the schematic representation of starter assembly 36. The graphical responses indicating these changes in the condition of the physical system, and therefore in the student's mental visualization of the system, may be given by the student in response to written or verbal questions or instructions regarding the particular malfunctions or other changes in the system.

Alternatively, or in conjunction with such verbal questions or instructions, other associative conditions may be supplied which indicate to the student the nature of the malfunction and the type of response required. For example, the student may be taught to recognize and associate certain sounds with particular changes in the system; these changes should automatically become apparent in the student's mental visualization of the system and the graphical response made according to the present inventions will indicate whether or not such is the case. Use of the invention in this manner encourages the student to visualize the entire system and thus to think of each element as an integrated part of a composite whole rather than as essentially isolated elements. Using this approach in more and more areas of the student's instruction encourages and develops his tendencies and abilities to visualize complete systems, and his problem solving ability with respect to malfunctions or other changes in the condition of such systems will be greatly enhanced since it is less and less dependent upon his recollection of any one of a long series of isolated facts concerning the system.

Figure 4:
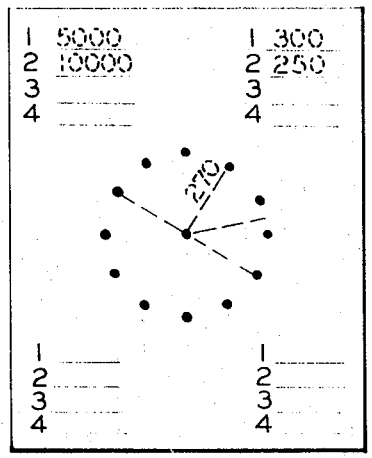
FIGS. 4–6 illustrate still further examples of possible forms of instructional material and means to assist in student recording thereof with which the invention may be practiced.

In FIG. 4 are shown an array of dots and arrangement of other reference markings such as might be provided for orientation purposes on the surface of sheet 18 for a particular instructional segment. In this example, the reference markings are intended to orient the recording of such things as certain aircraft flight procedures and holding patterns. This might form an instructional segment of a student pilot's ground training with the numbered lines being used to record such things as desired altitudes, airspeed, flap positions, etc. and the circular array of dots for recording headings, offsets, and the like. A typical instruction might be to record an assumed initial heading and to draw in the limits, offset, departure from fix, inbound and outbound headings for a specified hold entry. Desired altitudes, airspeed, etc. may be recorded in accordance with an instruction to do so for a two-engine approach in a specified aircraft at a particular runway, with the necessary correlating data being previously supplied. Furthermore, the situation may be modified as the exercise progresses by informing the student of changes in the controlling parameters; for example, while executing standard maneuvers in the aforementioned approach, the student could be instructed that the aircraft has a landing gear malfunction and he is to execute a go-around.

The dotted lines and numbers in FIG. 4 indicate typical markings which would be made by the student on the surface of the reference sheet, but with such markings not immediately visible. Thus, the student pilot is forced to continuously retain and refer to a mental visualization of the position and movement of the aircraft as the instructed maneuvers are executed. Since no visual references, including those which he himself has previously recorded, are provided the final recording will be a quite accurate indication of the efficiency with which the student visualizes the situation. This example provides a good indication of how the present invention may be used to train and enhance the student's ability to form a dynamic mental visualization of a situation with constantly changing parameters. The student is also encouraged by this system to form a "mental preplan" or future projection of anticipated procedures, and the like.

Figure 5:
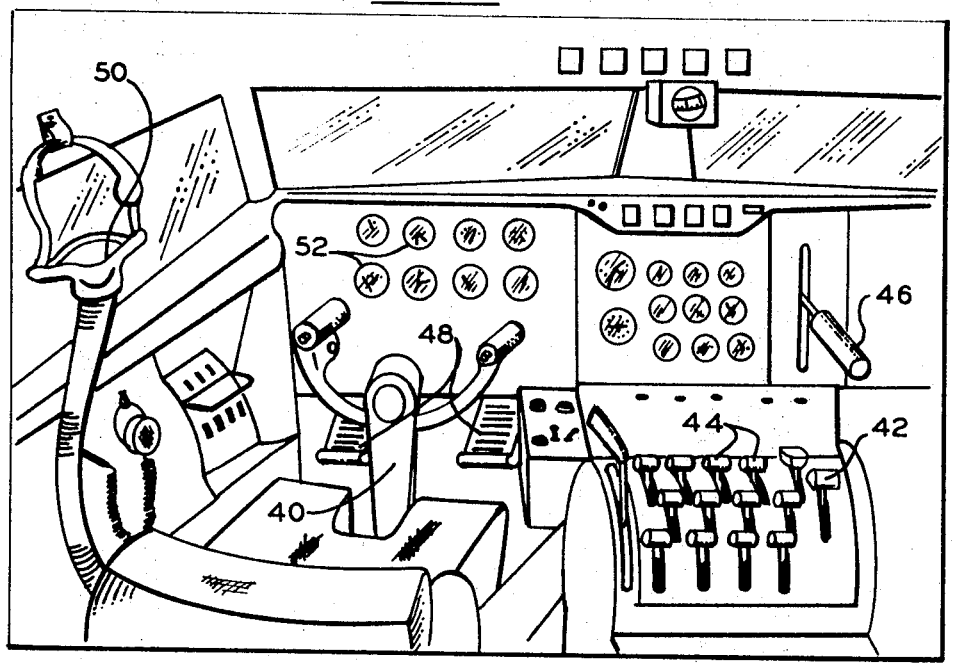

To illustrate another type of instructional material which may be presented by utilizing the principles of the present invention, FIG. 5 shows some of the interior details of the cockpit of a particular type of aircraft. This could be provided to the student in the form of an actual photograph of the cockpit, or the student could be expected to utilize a visual image of the cockpit interior formed by exposure to and training in an actual cockpit of this type. The cockpit contains such items as the main control column 40, flap position control 42, throttle controls 44, landing gear control 46, rudder pedals 48, emergency oxygen mask 50, a panel of instruments and indicators 52, etc. In order to provide graphical responses in accordance with the invention in response to questions and instructions pertaining to cockpit procedures and the like, the student would be provided with an overlay such as that shown in FIG. 6. This overlay includes appropriate reference marks providing to the student an orientation of the page, or other space with which he is provided for making graphical responses, with his mental image of the cockpit interior. The reference marks may be provided in various degrees of detail as may be appropriate for particular instructional material, the reference marks in FIG. 6 which correspond to the actual controls and the like shown in FIG. 5 being indicated with like reference numerals.

Figure 6:
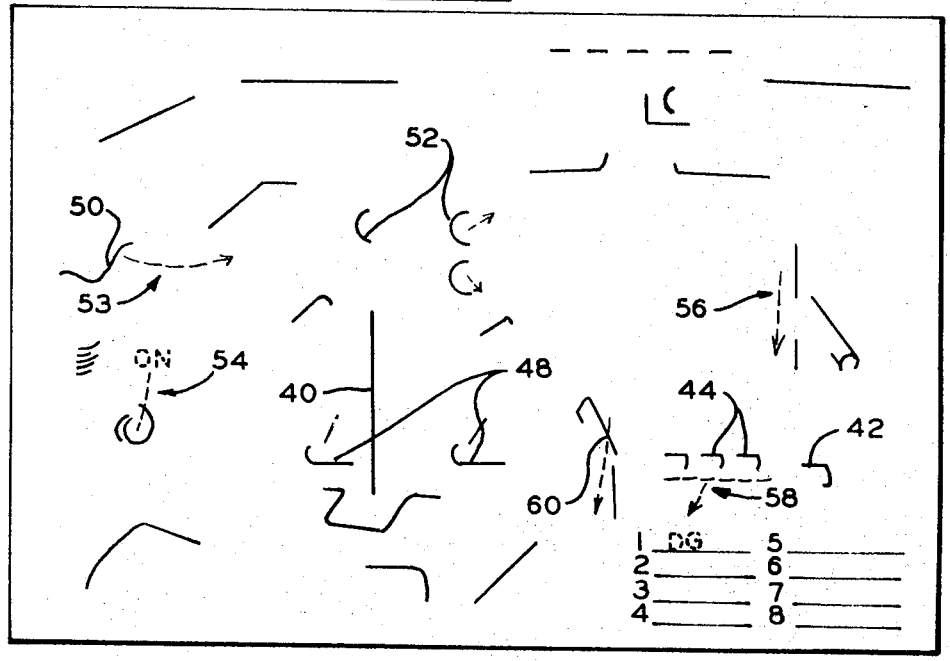

The student may then be given additional instruction in the use of standard abbreviations and/or symbolic indications representing various cockpit procedures or steps, some or all of which may be correlated with the overlay. For example, a typical instruction might be to indicate by graphical response utilizing the overlay the various steps involved in an emergency descent procedure. As the student mentally visualizes the physical steps which he performs in the cockpit and the effect of such steps, in combination with external factors, on the various instruments and controls, he makes appropriate markings with the stylus on the overlay to record graphical indications of such in a location not visible to him. First, the steps of donning the oxygen mask and turning on the emergency interphone system are represented by the notations indicated by reference numerals 53 and 54, respectively, emanating from the positions of the face mask and microphone within the cockpit. The step of placing the landing gear in the down position is represented by the arrow indicated by the reference numeral 56, corresponding to the position and direction of movement of the landing gear control on the overlay; the actual command for placing the gear in the down position may also be indicated by an appropriate abbreviation such as "DG" in space provided along one side of the overlay, for example. Throttle movement is indicated by the line numbered 58, spoilers up by the line numbered 60, and so forth. At appropriate times during the procedure, the student may be instructed to insert on the dials and instruments an appropriate needle position, or the like, to show such things as present altitude, airspeed, etc. The lines and other notations made by movement of the stylus are shown in FIG. 6 in dotted lines to indicate that they are not visible to the student, it being understood that such markings would appear as solid lines in the visible image thus formed. An examination of the visual image after completion of the exercise will reveal any weaknesses in the student's mental visualization thereof.

Without going into further detailed explanations, it may readily be seen that a wide variety of procedures and situations may be recorded in the above-described manner and the results will provide a good indication of how well the student visualizes the situation or procedure and the manner in which it is carried out. This, in turn, provides a good indication of each individual's efficiency, accuracy, etc. in the actual performance of such procedures under real-world conditions. Continued exposure of individual students to the teaching-testing system of the present invention will provide a marked increase in the proficiency of task performance and reasoning functions associated with the particular types of subject matter taught, as well as in the student's general approach to all problems and situations with which he is confronted and which are susceptible of assistance from some degree of mental visualization, which is the case in virtually all situations to a greater or lesser extent.

Figure 7:
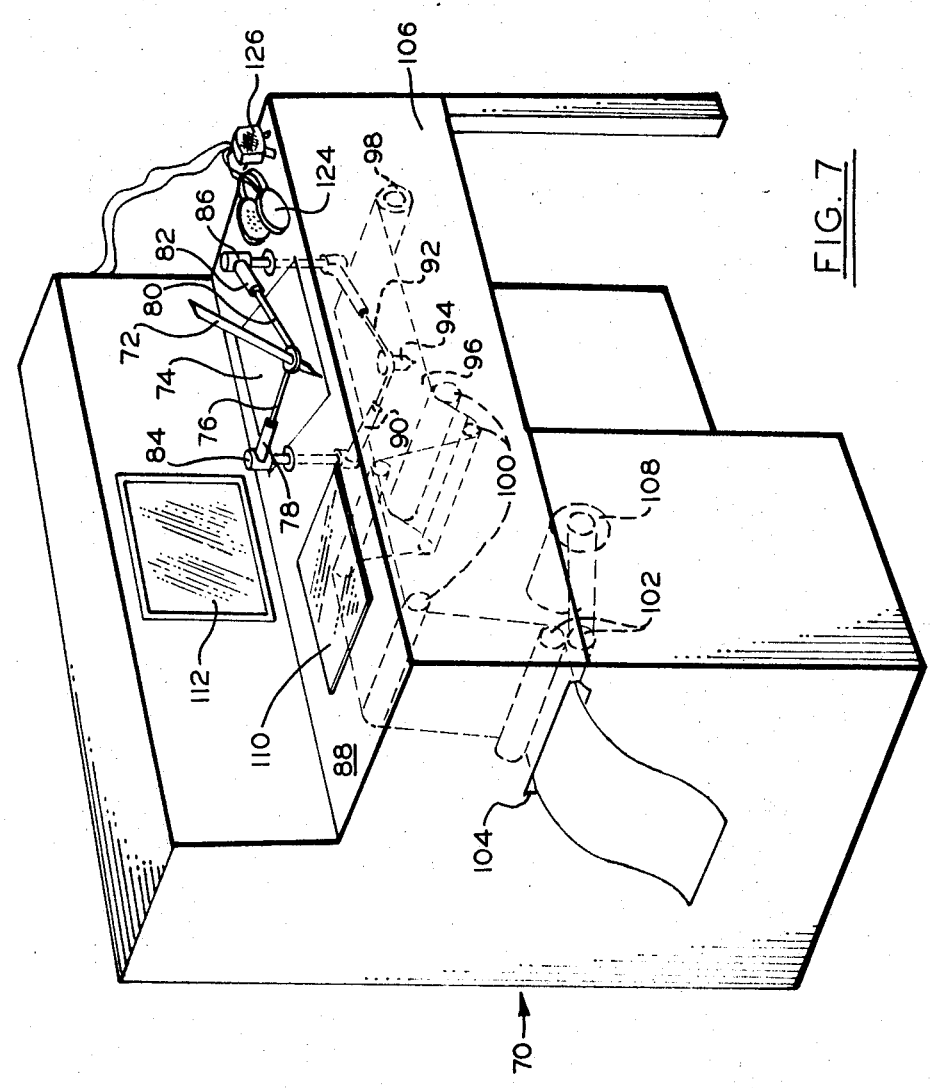
FIG. 7 is a perspective view of another embodiment of means for recording student responses in accordance with the invention, and having a number of refinements and additional capabilities from the FIG. 1 embodiment.
Figure 8:
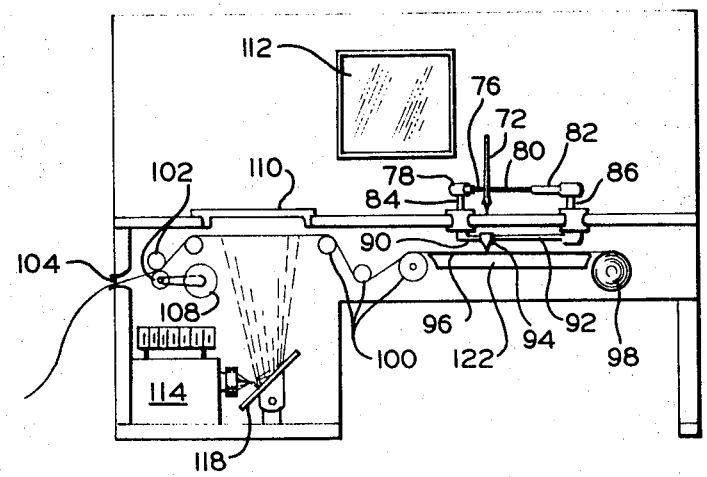
FIGS. 8 and 9 are front and side elevational views, respectively, of the apparatus of FIG. 7 with portions in section.
Figure 9:
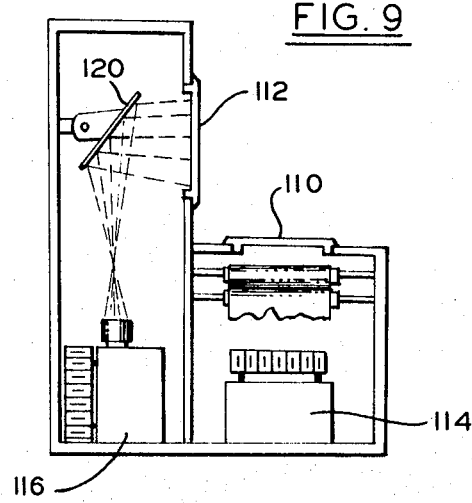

FIGS. 7–9 illustrate a somewhat more advanced form of apparatus for practicing the present invention. This apparatus is in the form of a console, indicated generally by the reference numeral 70, at which the student is seated while making the graphical responses to questions and instructions as explained earlier herein. A stylus 72 may be manually grasped by the student and moved in any direction with its point in contact with a designated area 74. Stylus 72 is supported on a pair of arms formed of telescoping sections 76 and 78, and 80 and 82, respectively. Arm sections 78 and 82 in turn are rigidly connected to vertical supports 84 and 86, respectively, which slidably extend through upper surface 88 of console 70. Telescoping supports 90 and 92, constructed identically to the arm supports made up of sections 76, 78, 80, and 82, extend from the lower ends of vertical supports 84 and 86. At their ends opposite the connections with supports 84 and 86, arms 90 and 92 hold writing instrument 94 such as an ink pen, crayon, or the like. An elongated strip of paper 96, or other material suitable for receiving a permanent written record from writing instrument 94, is fed from supply roll 98, supported on a suitable spindle within console 70, through a series of guide rolls 100, between a pair of drive rolls 102, and out of console 70 through opening 104. Front panel 106 of console 70 may be hinged along one side and movable to an open position to allow access to the interior of the console. Appropriate drive means, such as a conventional electric motor, are connected to drive rolls 102 for the purpose of moving strip 96, due to its engagement between the drive rolls, along the path defined by guide rolls 100 and out of console 70 when the drive means, indicated diagrammatically by the reference numeral 108, are energized.

In order to present visual information to the student, a horizontally disposed viewing surface 110 and a vertically disposed viewing surface 112 are provided. Visual material may be displayed upon surfaces 110 and 112 by slide projectors 114 and 116, respectively, which are focused upon mirrors 118 and 120 in the manner indicated in FIGS. 8 and 9. Appropriate instructional material is previously recorded upon the slides available to the respective projectors and displayed in response to remote commands under the direct control of an instructor or under automatic, programmed control such as from a computer. For example, the slides available for display on viewing surface 112 could include data defining the initial parameters of a situation, and could also contain instructions regarding the nature of the graphical response required from the student. In order to make the graphical response the student would move stylus 72 in the desired manner across surface 74 aided, if appropriate, by reference markings provided thereon. Due to the construction and arrangement of the supporting arms and vertical supports with which stylus 72 and writing instrument 94 are associated, there is a direct correspondence between movement of the writing instrument on the surface of paper 96 and the movement of stylus 72 in contact with surface 74. When stylus 72 is lifted out of contact with surface 74, to be moved to a new position, writing instrument 94 is likewise lifted out of contact with paper 96 due to the rigid connection of the support arms with vertical supports 84 and 86, and the slideable movement of the latter through upper surface 88 of the console. Appropriate backing means 122 (FIG. 8) may be provided for paper 96 to assist in making a proper written recording. Although a rather crude, purely mechanical system is shown for purposes of brevity and simplicity of disclosure, it will be readily understod that the system is subject to many modifications. For example, the connection between stylus 72 and writing instrument 94 could be electrical rather than mechanical, or a combination of the two, and paper 96 could be vertically disposed within the upright rear portion of the console, rather than in the manner shown.

In addition to the written material which the student may view on surface 112, it may be desirable in certain applications to provide audible instructions. Earphones 124 (FIG. 7) may be provided for this purpose and connected to appropriate recording means, such as a conventional tape recorder, which may conveniently be housed in the rear upright portion of console 70. Likewise, microphone 126 may be provided, and connected to an appropriate recorder system, for recording verbal responses from the student in situations where this is desirable. Such verbal responses should be required as necessary to form, in conjunction with the written response, an indication of the student's mental visualization of the subject matter under investigation at the time.

Paper 96 will normally be stationary during such times as written responses may be made. At the completion of a particular exercise, or designated portion thereof, drive means 108 are energized and paper 96 is advanced to a position where the written response just completed is in registration with horizontal viewing surface 110. At this time a slide is projected from projector 114, to be visible through paper 96 and the material recorded thereon. The slide may be in the nature of an "answer overlay" to provide the student with an immediate visual indication of the degree of accuracy of the graphical response he has just given. The information on the slides in projector 114 may also provide further information, e.g., the addition of further elements to the material just recorded for use in the next exercise.

It should also be apparent that the teaching-testing system of the present invention may easily be adapted to multi-media, programmed instruction. In the embodiments already described, provision may be made for multiple visual and audio presentation of material to the students; it would be equally feasible to supply information sensed by smell (to simulate leaking exhaust fumes or burning insulation, for example) as well as touch or feel (e.g., engine vibration). The student responses could be arranged so as ot be immediately visible to the instructor, although concealed from the students. The console of FIGS. 7-9 could be arranged with the recording medium (paper 96) vertically disposed in the back of the console, as previously suggested, and the recorded responses could be immediately visible to an instructor viewing the console from the rear. Of course, a number of such consoles could be arranged to provide for simultaneous surveillance by the instructor of the responses made on each. Such an arrangement would provide immediate and continuous class evaluation, thereby allowing more appropriate and timely modification of inputs of new material to the students.

From the foregoing description it may be seen that the present invention may be employed with a wide variety of apparatus to improve a student's mental imaging capabilities, and thereby to improve his general powers of recall and reasoning based thereon. A means is provided for determining in a much more precise manner than anything offered by the prior art the exact extent of an individual's mental image of a particular object, system, situation or the like. By recording a graphical response based upon one's present mental image without the benefit of visual reenforcement of such image by the material which has been recorded up to any given point in the exercise, the individual's imaging powers are developed and strengthened and, at the same time, weaknesses or problem areas are discovered. Thus, the invention may be used as a most valuable adjunct to virtually any teaching program at all levels of learning.

What is claimed is:

1. A method of developing an individual's capacity to form and utilize accurate mental images of materials to which he has been previously exposed, said method comprising:
   (a) presenting to the individual selected instructional material having a content susceptible of mental visualization;
   (b) causing the individual to record graphically in a location not visible to the individual a reproduction based on his mental image of said selected material; and
   (c) placing a pre-recorded overlay sheet bearing indica corresponding to a desired graphical reproduction in proximity to the graphical record made by the individual to facilitate visual comparison of said overlay sheet and graphical record, and thereby evaluation of the completeness and accuracy of the individual's mental image of said selected material.

2. The invention according to claim 1 wherein said selected material is in printed form for visual presentation to the individual.

3. The invention according to claim 1 wherein said graphical record is made by moving the point of a stylus, or the like, on a first surface visible to the individual but without leaving a visible trace on said first surface, while recording a visible image of the movement of the stylus point on a second surface not visible to the student.

4. The invention according to claim 3 wherein said first and second surfaces are superposed so that the pressure of said stylus point is transmitted to said second surface to cause a visible recording thereon, an opaque sheet being superposed on said first surface while said graphical record is being made.

5. The invention according to claim 3 wherein mechanical movement of said stylus is transmitted to a separate writing instrument in contact with said second surface, thereby forming a visible image on said second surface in accordance with movement of said stylus on said first surface.

6. The invention according to claim 5 and further including the step of projecting an image of said graphical record, after completion thereof, and an image of said overlay sheet to facilitate comparison of the two.

7. A method of developing an individual's capacity to form and utilize accurate mental images of material to which he has been previously exposed, said method comprising:
   (a) presenting to the individual selected instuctional material having a content susceptible of mental visualization;
   (b) causing the individual to record graphically in a location not visible to the individual a reproduction based on his mental image of said selected material;
   (c) presenting to the individual additional instructional material having a content so related to said selected material that the individual's mental image of said selected material is altered thereby;
   (d) causing the individual to record graphically in said location a reproduction based on his mental image as altered by said additional material; and (e) placing a pre-recorded sheet bearing a reproduction of the desired composite response made by the individual in proximity to the graphical record made in response to said selected and said addition material for visual comparison, thereby facilitating evaluation of the completeness and accuracy of the individual's mental image based on said selected and said additional material.

References Cited
UNITED STATES PATENTS

| | | | |
|---|---|---|---|
| 12,049 | 12/1854 | Ames | 35—37 X |
| 1,971,119 | 8/1934 | O'Neil | 35—26 X |
| 3,162,959 | 12/1964 | Woolman | 35—9 |
| 3,181,865 | 5/1965 | Tout | 35—66 X |

WILLIAM H. GRIEB, Primary Examiner

U.S. Cl. X.R.

35—66